United States Patent [19]

Garcia

[11] 4,061,105
[45] Dec. 6, 1977

[54] SAIL TO ROW

[76] Inventor: Onofre S. Garcia, 77 Prospect St., Newark, N.J. 07105

[21] Appl. No.: 701,242

[22] Filed: June 30, 1976

[51] Int. Cl.² .............................................. B63H 13/00
[52] U.S. Cl. .......................................................... 115/3
[58] Field of Search ...................... 115/3, 28 R, 29-33; 416/117-119; 290/54, 55; 114/39

[56] References Cited

U.S. PATENT DOCUMENTS

| 132,768 | 11/1872 | McDill | 416/119 |
|---|---|---|---|
| 226,957 | 4/1880 | Barnes | 115/29 |
| 1,506,847 | 9/1924 | Maki et al. | 115/3 |

FOREIGN PATENT DOCUMENTS

| 571,943 | 1/1958 | Italy | 115/28 R |

Primary Examiner—Trygve M. Blix
Assistant Examiner—Jesus D. Sotelo

[57] ABSTRACT

This invention pertains to power for a boat, comprising a vertically mounted rotary sail device generally amidship of the boat, a power transmission driven by the sail device, pulley directed cable, connecting between the power transmission and a pair of opposed side oar devices normally disposed in the water. The sail device is constructed in a manner whereby it always rotates in the same direction regardless of the wind direction, creating a condition whereby the boat may be directed on a straight course toward any point of the compass. A second, lever operated cable and pulley is provided to control the oar devices in a manner so as to reverse the operation of the oars with a resulting reversal of direction of the boat.

21 Claims, 11 Drawing Figures

SAIL TO ROW

FIELD OF THE INVENTION

The present invention is directed to power means for a boat, comprising a unique rotary sail, drivingly connected to reversible oar means. The boat may be directed on a straight course toward any point of the compass and the direction of movement may be reversed at any time.

BACKGROUND OF THE PRESENT INVENTION

It is a well known fact that conventional sailboats can pursue a generally straight line course between two points when sailing with the wind. However, when moving into the wind, conventional sailboats must pursue a very slot zig-zag or tacking course. On such a course, the actual distance traveled far exceeds the straight line distance between the two points. Additionally, the skipper of the sailboat must properly manipulate the sails on each tack.

The rotary said actuated oar device of the present invention permits a boat to be directed on a straight line course between any two points regardless of the wind direction. In addition, the oars are constructed and controlled in a manner which permits the boat skipper to reverse the direction of movement of the boat at will.

OBJECTS AND ADVANTAGES OF THE PRESENT INVENTION

One of the principal objects of the present invention is to provide a boat with a rotary said actuated oar device which is operated solely by wind forces and permits the boat to pursue a straight line course on the water, between any two given points, regardless of the wind direction.

Another principal object of this invention is to provide a multiple oar structure and control means which permits the direction of movement of the boat to be instantly reversed at any time.

A further object of the instant invention is to provide a rotary sail comprised generally of a vertical central support pole, fixed amidships of a boat, a vertical rotary tower journaled on the upper end portion of the support pole and a plurality of vertically disposed, radially extending sail assemblies fixed relative to the rotary tower.

A still further object of the present invention is to provide each sail assembly with a generally open rectangular framework for attachment to the peripheral edge of the tower and a plurality of sail panels, hinged relative to the open framework in a manner whereby the plurality of panels are pivoted to a generally planar, closed relation to the open framework to cause the entire sail and tower structure to rotate when contacted by wind forces in a first direction, and to an open relation to the framework when contacted by wind forces in a second direction to permit said wind forces to pass therethrough with virtually no reaction thereon.

Yet another object of this invention is to provide a power transmission means, fixed relative to the bottom end of the rotary tower, and a pulley directed cable means from the power transmission means to a pair of opposed side oars to cause said oars to synchronously reciprocate back and forth.

Another object of this invention is to provide two sets of oar blades on each end of each oar assembly and a shiftable means on each oar assembly to selectively activate one or the other of each of said two sets to provide for forward or backward movement of the boat.

A further object of this invention is to provide a selector lever, operably connected to the shiftable means on the oars by means of a second cable and pulley arrangement to accomplish the forward and backward oar blade positions.

DETAILED DESCRIPTION OF THE DRAWINGS

Figure 1:
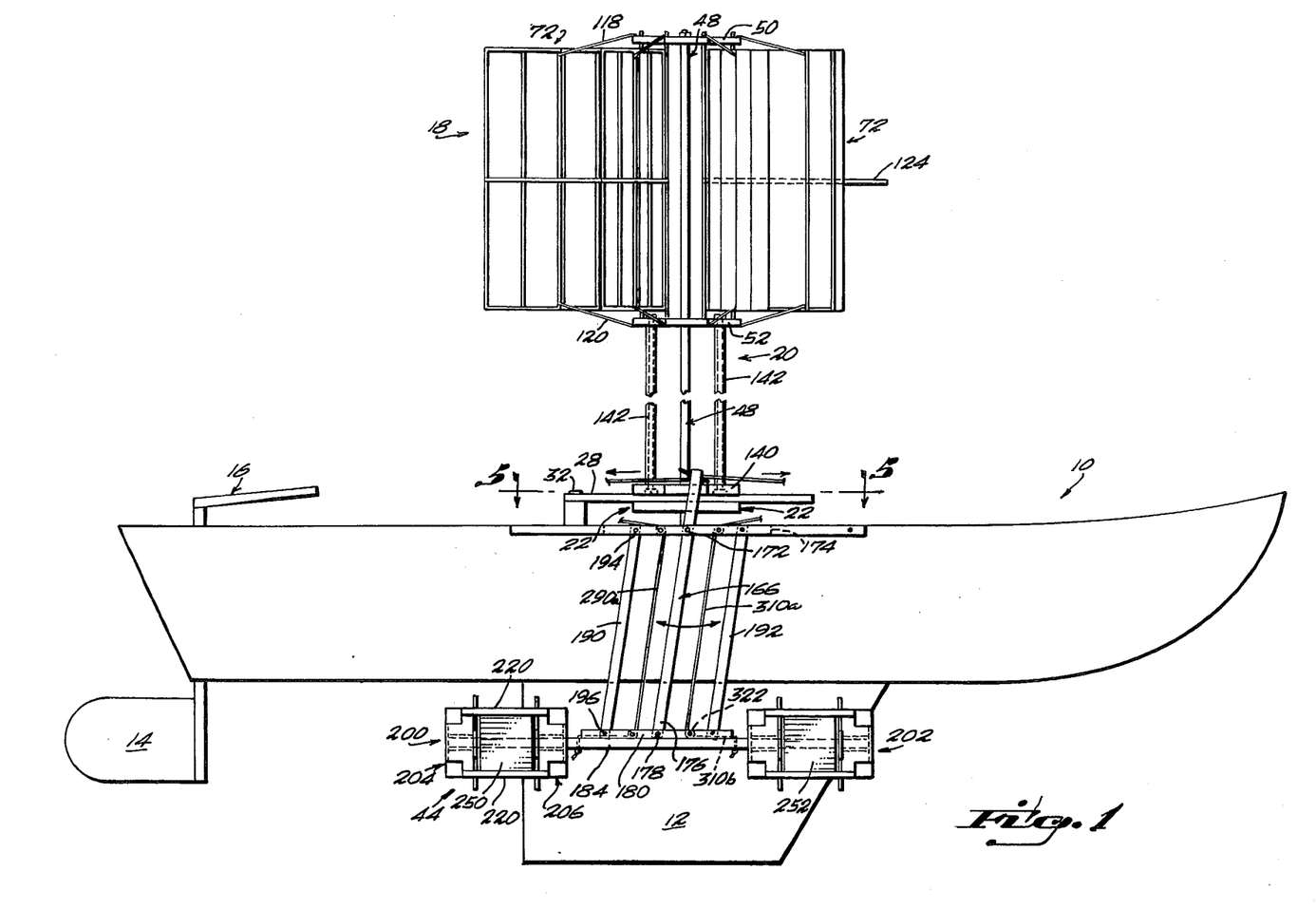
FIG. 1 is a side elevational view of a boat incorporating the sail actuated oar device of the present invention.

With reference to the drawings in which like reference characters designate like or corresponding parts throughout the various views and with particular reference to FIG. 1, the numeral 10 generally designates a boat having a keel 12, rudder 14, and tiller 16.

Figure 5:
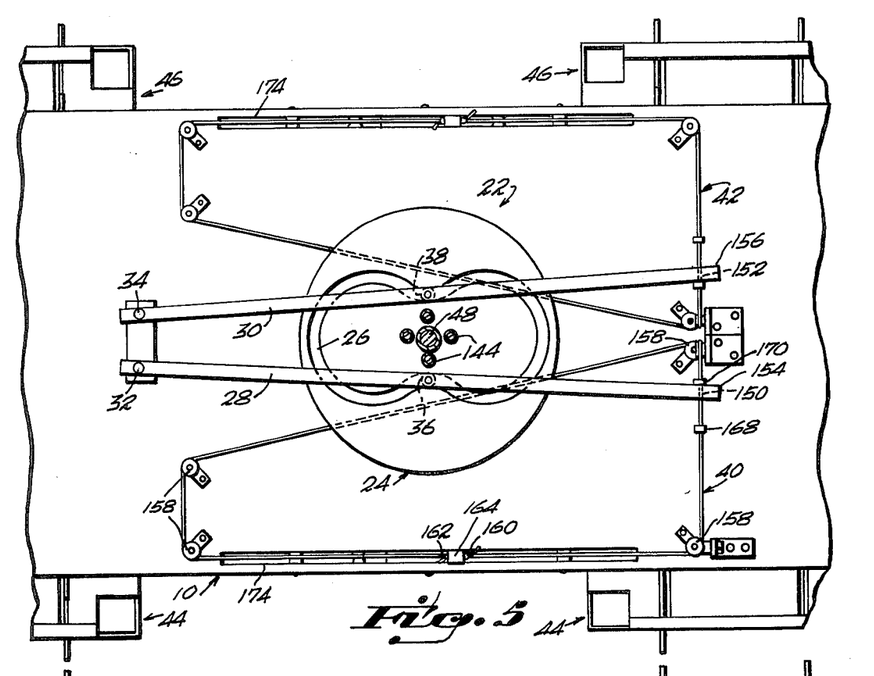
FIG. 5 is a cross sectional view taken along line 5—5 of FIG. 1, illustrating the power transmission means and the oar reciprocating cable and pulley means.
Figure 6:
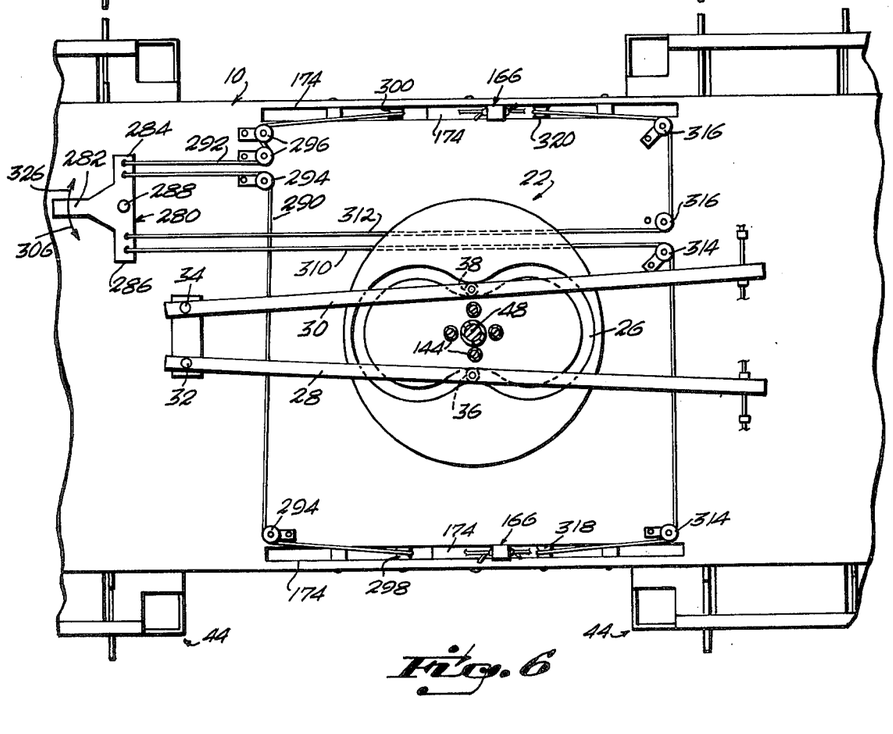
FIG. 6 is a view similar to FIG. 5 but illustrating the forward and rearward selector lever and the forward and reverse cable and pulley means. Both cable and pulley assemblies of FIGS. 5 and 6 may occupy the same general area but for the sake of clarity are illustrated in separate views.

A rotary sail structure generally indicated at 18 is mounted relative to the upper end portion of a tower 20, located generally amidships. Adjacent the lower end of the tower 20, a power transmission means 22 is rotatably driven by the rotary sail structure by means of the tower 20. As best seen in FIGS. 5 and 6, the power transmission means comprises a disc 24 providing a symmetrical, generally 8-configurated cam track 26 in its upper side. A pair of lever arms 28 and 30 are pivotally attached at their respective rear ends 32 and 34, relative to a top portion of the boat.

With further reference to FIG. 5, the lever arms 28 and 30 extend forwardly across the power transmission disc 24, presenting respective cam track follower rollers 36 and 38 into the cam track 26 in an equally spaced relation to the respective end pivots 32 and 34. Therefore, when the cam track disc 24 is rotated, a symmetrical scissors movement will be imparted to the lever arms 28 and 30 actuating respective cables 40 and 42 fixed thereto, to impart synchronous forward and rearward movements to the opposed side oar assemblies 44 and 46 as hereinafter described.

Figure 2:
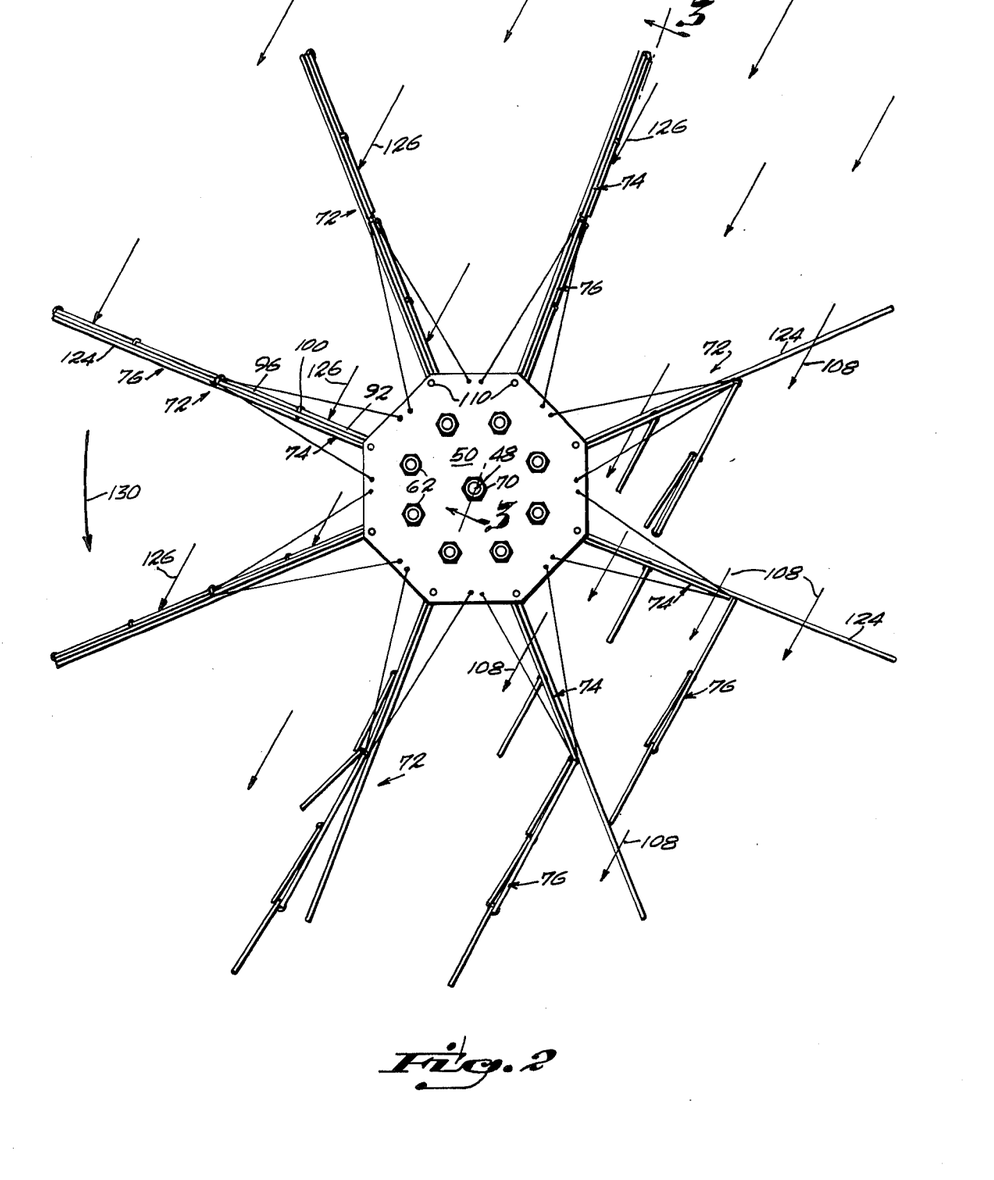
FIG. 2 is a semi-schematic top plan view of the rotary sail assembly thereof.
Figure 3:
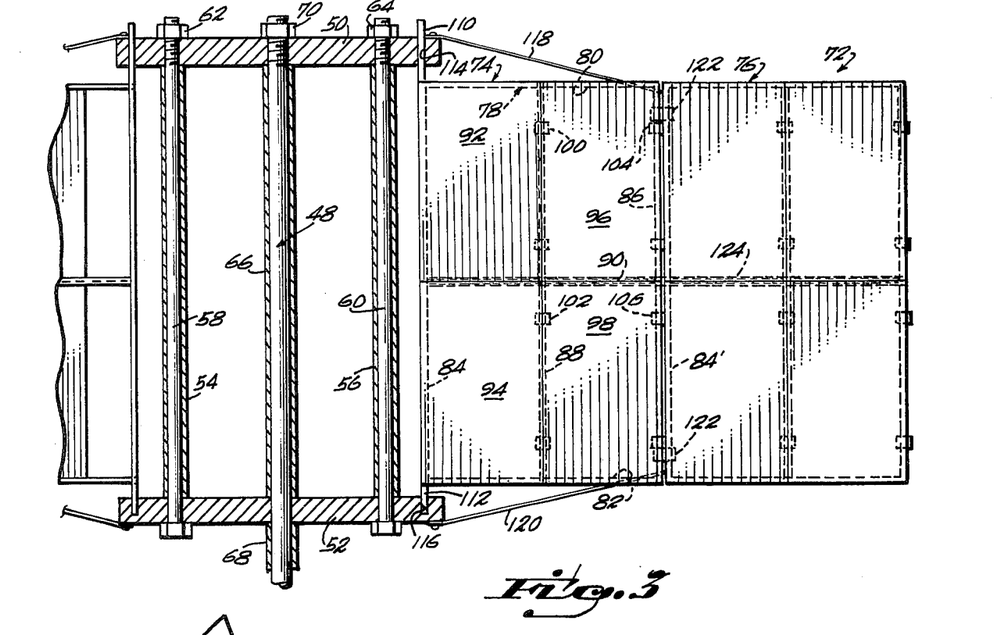
FIG. 3 is an enlarged fragmentary sectional view taken along line 3—3 of FIG. 2.

With further reference to the rotary said structure 18, as best seen in FIGS. 1 through 4, a vertically disposed shaft 48, adapted to rotatably carry the tower 20, is fixed at its lower end portion in any conventional manner to the boat deck or therebelow within the hull. As illustrated in FIGS. 1 and 3, the upper said carrying end of the tower 20 is comprised of upper and lower discs 50 and 52, held in a predetermined vertical spaced relation by a plurality of spacer tubes such as 54 and 56, traversed by elongated draw bolts 58 and 60 and locked in place by nuts 62 and 64. Similar upper and lower spacer sleeves 66 and 68 are disposed on the tower shaft 48. A top lock nut 70 is engaged on the threaded upper outer end of shaft 48.

As best seen in FIG. 2, a plurality of sail assemblies 72 are fixed in a spaced apart, outwardly, radially extending vertical disposition between the discs 50 and 52. In the form of the invention illustrated, eight equally spaced apart sail assemblies 72 are provided.

Figure 4:
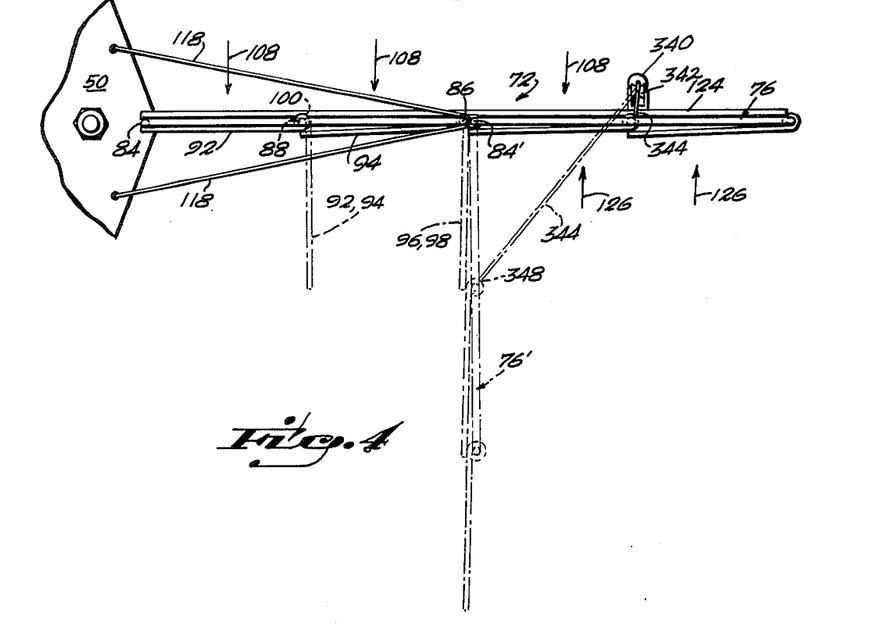
FIG. 4 is a top plan view of FIG. 3, illustrating the closed positions of the sail panels of one sail asembly in full lines, and the open positions thereof in broken lines.

With reference to FIGS. 2, 3 and 4, each sail assembly is comprised of two sail portions 74 and 76. The inner sail portion 74 is comprised of a generally rectangular open framework 78 formed of top and bottom horizontal rods 80, 82, inner and outer vertical side rods 84, 86, a vertical center rod 88 bisecting the lateral distance between side rods 84, 86, and a horizontal center rod 90, bisecting the vertical distance between the top and bottom rods 80, 82. Four symmetrical openings are thereby defined by the framework 78 and four sail panels 92, 94, 96 and 98 are pivotally hinged at 100, 102, 104 and 106 to the respective center vertical rod 88 and outer vertical side rod 86. The panels are sized to close against the various rods of the open framework 78 when pivoted inwardly to the closed positions of FIG. 3 and the solid line illustration of FIG. 4. When the sail panels 92 through 98 are pivoted outwardly by wind forces as illustrated by broken lines in FIG. 4, the four openings defined by the framework 78 remain open and would provide no resistance to the wind forces approaching from the back side as indicated by arrow 108. The inner, vertical side rod 84 includes upper and lower extensions 110 and 112 for engagement respectively through an upper hole 114 in disc 50 and into a blind hole 116 in bottom disc 52. Upper and lower guy wires 118 and 120, fixed between the respective discs 50 and 52 and the outer vertical rod 86, maintain the sail assemblies 72 in their proper spaced, radical positions.

The outer sail panel portion 76 is formed identical with the inner said panel portion 74 with the exception that the inner vertical side rod 84' provides no upper and lower extensions 110 and 112. The rod 84' is hinged at 122 to the outer vertical rod 86 of panel portion 74. A horizontal backing rod 124 is fixed relative to the inner panel portion 74 intermediate its height and extends radially outwardly to stop and align panel portion 76 with panel portion 74 when the wind direction is as indicated by arrows 126. When the wind direction is as indicated by arrows 108, the entire panel portion 76 is pivoted to the broken line position 76'.

FIG. 2 illustrates the manner in which the wind forces such as indicated by arrows 126 impinge upon the closed sail panels on one side of the sail device to drive or rotate the sail device counterclockwisely as indicated by the large arrow 130. The wind forces indicated by arrows 108 on the opposite side of the device open the panels in the manner above described, passing through the open frameworks offering little or no resistance to the free rotation thereof. Regardless of the direction of the wind, the rotary sail, as illustrated, will continue to rotate counterclockwisely. For example, if the wind direction completely reverses itself, the open panels of FIG. 2 will close, maintaining the counterclockwise rotation and the closed panels of FIG. 2 will open. The operation can be reversed to provide a clockwise rotation to the sail device by reversing the above described hinged connections to the opposite sides of the open frameworks.

The counterclockwise movement of the sail device is transmitted to a lower disc 140 by spacer tube and draw bolt attachment means 142 similar to those used to attach the tower discs 50 and 52. The lower disc 140 is closely spaced above the cam track disc 24 and is drivingly connected thereto by a plurality of spacer tube and draw bolt means 144, positioned inwardly of the cam track 26, as seen in FIGS. 5 and 6.

Referring now to FIG. 5 the pair of oar drive cables 40 and 42 are engaged through holes 150 and 152 in forwardly extended ends 154 and 156 of lever arms 28 and 30. Each cable such as 40 is extended around a plurality of strategically located pulleys such as 158 to direct the opposed ends thereof from opposite directions to points of attachment 160 and 162 to the upper extended end 164 of an oar operating lever 166.

Abutment means 168 and 170 are provided on each cable such as 40 in a predetermined spaced relation on the opposed sides of the lever end portion 154. When the rotary sail 18 is activated, the cam track disc 24 is driven in the direction of rotation of said rotary sail by means of the tube and draw bolt attachment means as above described. The symmetrical eight configurated cam track 26, engaging the follower rollers 36 and 38, imparts a continuous scissors action to the lever arms 28 and 30. The ends of each lever arm such as 154 alternately engages the abutments 168 and 170 to impart a reciprocating movement to the cable 40. The reciprocating movement is imparted to the oar operating lever 166 by means of the cable connections, above described. With reference to FIG. 1, it can be seen that the reciprocating movement of lever arm 166 is imparted to an oar assembly such as 44. The lever is pivotally connected at 172, intermediate its length, in a slot 174 approximately at deck level. The lower end 176 of lever 166 is pivotally connected at 178, intermediate the length of the oar assembly 44. While the reciprocating oar device has been described relative to one oar 44, it is obvious that by means of the second lever arm 30 and cable 42, the second oar assembly 46 is simularly driven in synchronization with oar assembly 44. The length of the oar strokes can be adjusted by varying the spacings between the pairs of cable abutments 168 and 170 to adjust the lost movement of the lever arm ends 154 and 156 along the respective cables 40 and 42.

With reference to FIGS. 1, 7, 8 and 9, the lower end 176 of lever 166 is pivotally connected at 178 between a pair of upward bar extensions 180 and 182 fixed respectively atop a pair of lower spaced apart oar bars 184 and 186 extending the length of the oar assembly. A pair of stabilizing idler arms 190 and 192 are each pivotally connected between the upper slot 174 and the bar extensions 180 and 182 as at 194 and 196.

Figure 7:
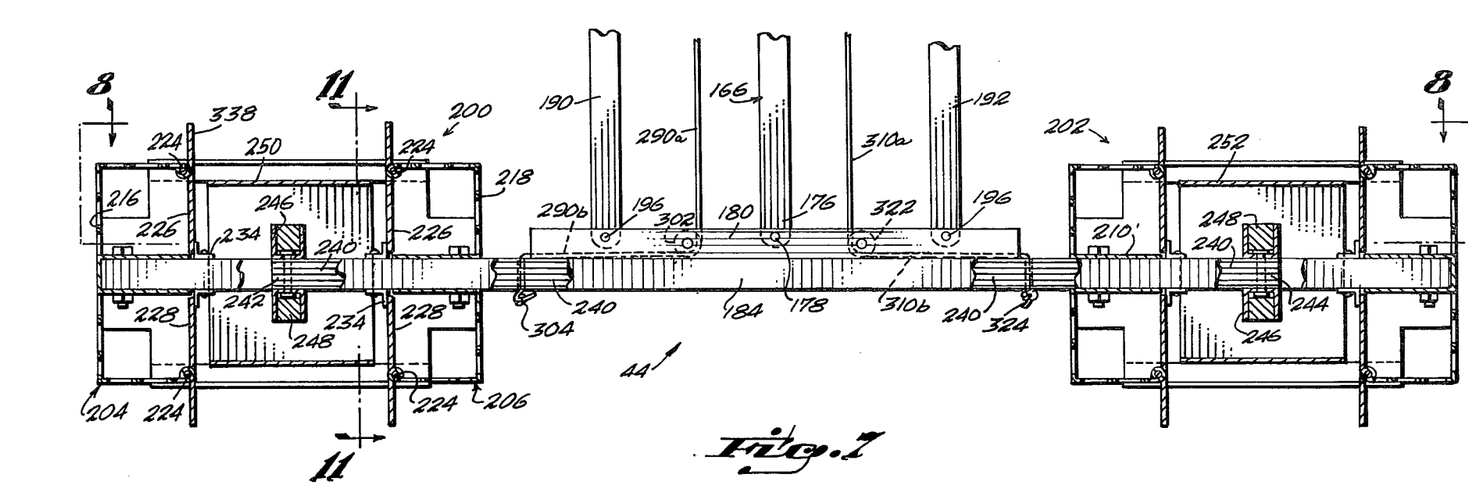
FIG. 7 is a longitudinal, vertical sectional view through one oar assembly of this invention.
Figure 8:
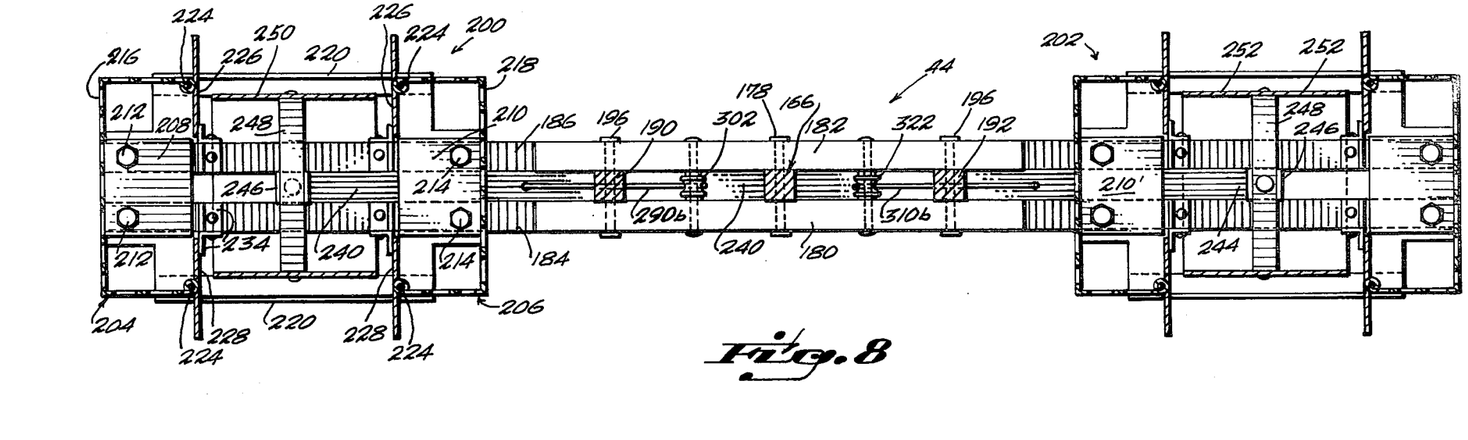
FIG. 8 is a longitudinal, transverse sectional view taken along line 8—8 of FIG. 7.
Figure 9:
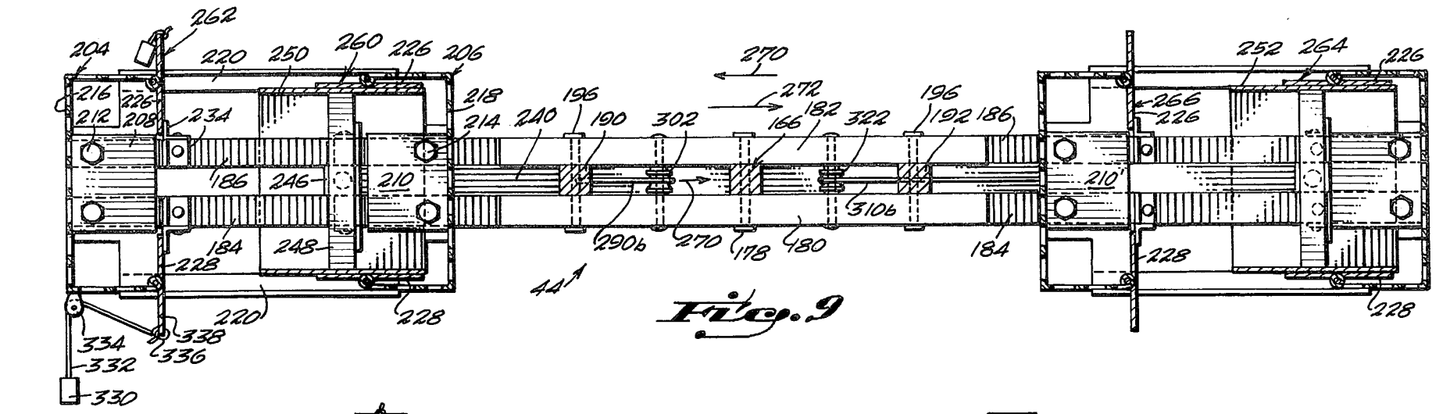
FIG. 9 is a view similar to FIG. 8, illustrating the operation of the forward and reverse mechanism of the oar.

Each oar assembly such as 44 is comprised generally of the spaced apart longitudinal oar bars 184 and 186 with oar head assemblies 200 and 202 fixed relative to the opposite ends thereof. Each oar head such as 200 is provided with a pair of longitudinally spaced apart end caps, an outer cap 204 and an inner end cap 206. Both end caps 204, 206 are formed from a relatively heavy wire mesh, expanded metal or any other appropriate type of openwork structure to permit a free flow of water therethrough. The respective end caps are provided with aligned, longitudinal, central tubular members 208 and 210, to receive the oar bars 184 and 186 in a fixed relation as by nuts and bolt means 212 and 214. As best illustrated in FIGS. 7, 8 and 9, the central tubular members 208 and 210 are rigidly fixed as by welding to the opposed end walls 216 and 218 of the respective end caps 204 and 206, and four corner angles 220 rigidly connect between said end caps 204 and 206.

Figure 11:
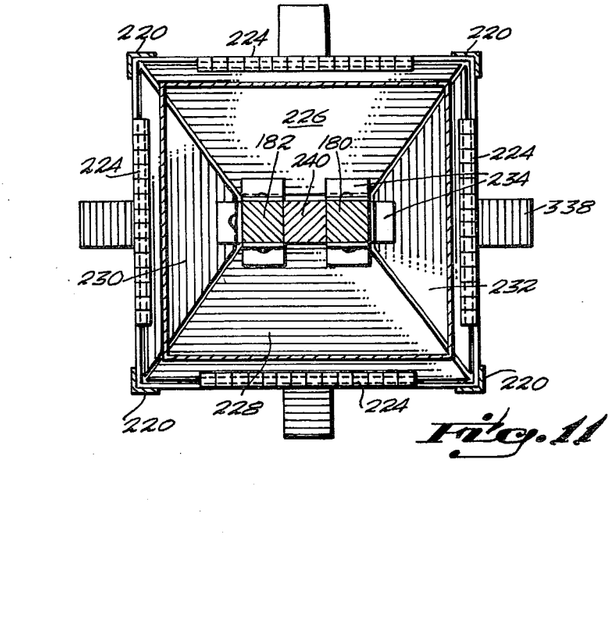
FIG. 11 a vertical cross sectional view taken along line 11—11 of FIG. 7.

The oar heads such as 200 are generally rectangular in vertical cross section and the opposed four inner edges of both end caps 204 and 206 are hingedly connected at 224 to respective oar blade segments 226, 228, 230 and 232 (see FIG. 11). As illustrated, the four blade segments are all of a generally truncated triangular configuration and substantially fill or block the inner, vertical, cross sectional area, defined by the end caps when in their extended or closed vertical positions. Abutment means such as the angle segments 234 are fixed to the oar bars 184 and 186 in positions to orient the blade segments 226 through 232 in first vertical positions.

As illustrated in FIGS. 7 through 11, a longitudinal slide bar 240 is slidably engaged between the oar bars 184, 186 and is longitudinally slidably directed through the opposed inner tubular members 210 and 210' of the oar heads 200 and 202. The opposed outer ends 242 and 244 of the slide bar 240 are rigidly fixed by bracket and cross bar means 246 and 248 within enlarged generally rectangular, tubular, directional shift members 250 and 252 normally disposed within the respective oar heads 200 and 202 between the end caps 204 and 206 in a neutral position.

As previously stated, each oar head 200 and 202 is provided with two sets of four oar blade segments 226 through 232. For the sake of clarity in the explanation of the operation thereof, the four sets of oar blade segment assemblies will be indicated generally at 260, 262, 264 and 266. Referring to FIG. 9, when the slide bar 240 is shifted in the direction of arrow 270, the tubular shift member 250 of oar head 200 will be moved to engage and pivot the four oar blade segments 260 of oar head 200 to open positions and the tubular shift member 252 will be moved to engage and pivot the four oar blade segments 264 of oar head 202 to like open positions. The blade segments 260 and 264 thereby become inoperative to propel the boat. As the reciprocating movement is imparted to the oar assembly by the rotary sail device as above described, each movement of the oar assembly in the direction of arrow 270 will cause a waterpressure reaction against the oar blade segment assemblies 262 and 266 to propel the boat in the direction of arrow 272.

When the slide bar 240 is shifted in the opposite direction, the shift tubes 250 and 252 will move to open and render inoperative the blade segment assemblies 262 and 266, and the blade segment assemblies 260 and 264 will close to cause the boat to reverse its direction of movement.

The slide bar 240 is manually actuated to neutral, forward and reverse positions by means of the control lever 280 in FIG. 6. The control lever 280 includes a handle 282, oppositely extending lever portions 284 and 286 and is pivotally connected at 288 to any convenient top structure of the boat 10. A first pair of shift cables 290 and 292 are fixed relative to the lever portion 284 and are directed by pairs of pulleys such as 294 and 296 to the opposite sides of the device to be directed downwardly by single side pulleys 298 and 300, vertically pivoted in the side slots 174, 174 aft of the oar levers 166. As both shift cables 290 and 292 perform the same functions relative to the opposed oar assemblies 44 and 46, the operation of cable 290 will be described relative to oar 44. With particular reference to FIGS. 1 and 7, the downwardly directed portion 290a of cable 290 passes around a pulley 302 mounted between the pair of bar extensions 180 and is directed rearwardly at 290b to a point of attachment 304 to slide bar 240. Therefore, when the control lever 280 is rotated in a first direction 306 (FIG. 6), the cable portion 290b will be withdrawn, moving the slide bar 240 and shift tubes 250 and 252 to the positions in FIG. 9 causing the oar blade segments 260 and 264 to be held in opened positions. Consequently, each power stroke of the oar assembly will cause a water reaction against the blade segments 262 and 264 to propel the boat 10 in a forward direction. The blade segments 262 and 264 will open on each recovery stroke because of the pivotal hinge connections 224 as previously described.

A second pair of shift cables 310 and 312 are fixed relative to the lever portion 286 and are directed by pairs of pulleys 314 and 316 to the opposite sides of the device to be directed downwardly by single side pulleys 318 and 320, vertically pivoted in side slots 174, 174 forward of the oar levers 166.

The operation of cable 310 will be described relative to oar assembly 44 and with particular reference to FIGS. 1 and 7, the downwardly directed portion 310a of cable 310 passes around a pulley 322 mounted between the pair of bar extensions 180 and is directed forwardly at 310b to a point of attachment 324 to slide bar 240. When the control lever 280 is rotated in a second direction 326 (FIG. 6), the cable portion 310b will be withdrawn, moving the slide bar 240 and shift tubes 250 and 252 into positions to open the oar segments 262 and 266. Therefore, the power strokes of the oar assembly will be reversed and will cause a water reaction against the blade segments 260 and 264 to propel the boat 10 in a reverse or backward direction. The recovery strokes function the same as described relative to the forward drive of the boat.

Figure 10:
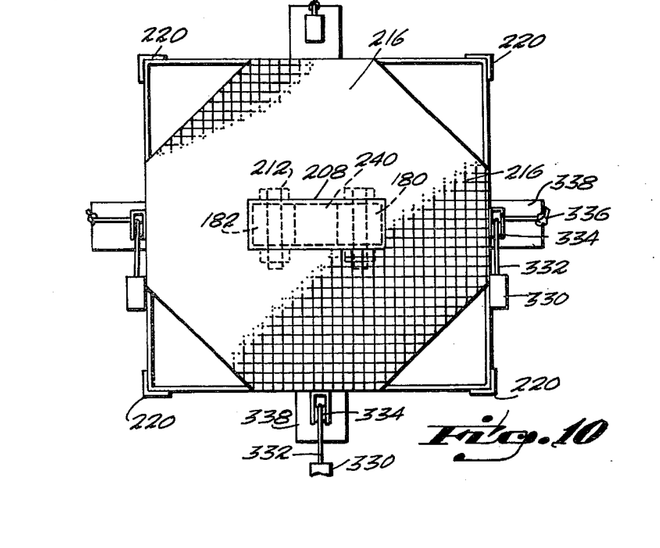
FIG. 10 is an end elevational view of one oar.

As illustrated in FIGS. 9 and 10, counterweights 330 may be attached to lines 332 which are passed over a pulley members 334, fixed relative to the peripheral edges of the cap end walls such as 216. From the pulleys 334, the lines are extended to points of attachment 336 to outward extending wing portions 338 of the respective oar blade segments 226 through 232. The counterweights 330 assist in returning the oar blade segments to their closed positions. Similarly, as in FIG. 4, counterweight assemblies 340 may be utilized to assist in returning the outer sail portions 76 to their radially extended positions. In this event the pulley members 342 are fixed relative to the horizontal backing rods 124 and a line 344 passes upwardly from the counterweight 346 over the pulley member 342 to a point of attachment 348 to the outer sail portion 76.

What is claimed is:

1. A sail actuated oar device for propelling a boat comprising:

A. a rotary sail structure rotatably mounted relative to the upper end portion of a shaft, normally, vertically mounted amidships of a boat, said rotary sail structure comprising, a plurality of vertically disposed, radially extending sail assemblies, fixed relative to a vertical tower means, rotatably mounted on said shaft; each sail assembly including sail panel means pivotal between first, generally planar, closed positions relative to an openwork frame assembly to cause a rotary movement of said rotary sail structure under the influence of wind forces directed against outside surfaces of said closed sail panel means, and second, open positions relative to said openwork frame assembly, accomplished by wind forces being directed against inside surfaces of said sail panel means, to permit an unrestricted movement of the wind forces through said openwork frame;

B. a power transmission means fixed relative to said rotatable tower in a spaced relation below said rotary sail structure;

C. oar means including reversible oar blade means to provide for selective forward and reverse movements of the boat;

D. means to transmit reciprocating, back and forth movement to said oar means from said power transmission means; and E. means to selectively shift said oar blade means to accomplish the forward or reverse movements of the boat, wherein each openwork frame assembly comprises inner and outer, generally rectangular peripheral frames, and at least one intermediate vertical and horizontal frame member fixed relatively to each of said peripheral frames; said outer rectangular frame is hinged for pivotal movement relative to the outer vertical side of said innter rectangular frame, and including a radially extending rod fixed relative to the inner rectangular frame to contact and maintain said outer rectangular frame in radial alignment therewith when the wind forces are directed against said outside surfaces of said sail panel means and to permit said outer rectangular frame and associated sail panel means to be pivoted angularly in a downwind direction when the wind is directed against said inside surfaces of said sail panel means.

2. The device as defined in claim 1 wherein said sail panel means comprises one sail panel sized to cover each opening defined on said inner and outer frames, said sail panels being pivotally hinged to respective vertical frame members to pivot against said frame members in said first, closed positions, and outwardly therefrom in said second, open positions.

3. The device as defined in claim 2 wherein said inner and outer peripheral frames and said intermediate vertical and horizontal frame members are positioned to form like symmetrical openwork patterns, permitting all of said sail panels to be of like size and shape.

4. The device as defined in claim 1 wherein said power transmission means includes a disc, fixed relative to the bottom of said tower, said vertical shaft extending centrally therethrough, and a cam track formed in one face of said disc.

5. The device as defined in claim 4 wherein said power transmission means includes a pair of cam lever arms pivotally connected at first ends, adjacent to each other, to any convenient structural part of the boat, said cam lever arms extending outwardly from said pivotal connections and presenting cam follower rollers, rotatably connected thereto, into engagement with said cam track on opposite sides of said vertical shaft.

6. The device as defined in claim 5 wherein said cam track is of a symmetrical configuration to impart a synchronized scissors movement to said pair of cam lever arms.

7. The device as defined in claim 6 wherein said cam track is generally of a FIG. 8 configuration.

8. The device as defined in claim 6 wherein said oar means comprises a pair of opposed side oar assemblies, each of which is comprised of an elongated, longitudinally extending oar bar assembly and a pair of oar heads, fixed relative to the opposed ends thereof.

9. The device as defined in claim 8 including a normally vertically disposed oar actuating lever associated with each of said side oar assemblies, each oar actuating lever including a lower end, pivotally connected intermediate the length of one of said oar bar assemblies, a pivotal connection, intermediate its length to an upper, side portion of the boat structure and an upwardly extending portion from said intermediate pivotal connection.

10. The device as defined in claim 9 wherein said means to transmit reciprocating, back and forth movement to said oar means comprises pulley directed cable means from each of the opposed sides of a second, extended end of each of said cam lever arms to points of connection relative to the respective opposed sides of the upper end of said upwardly extending portion of one of said oar actuating levers.

11. The device as defined in claim 10 including a pair of stabilizing idler arms disposed in a spaced relation relative to the respective sides of each oar actuating lever and being pivotally connected between the oar bar assembly and the boat hull in a like manner as said oar actuating lever.

12. The device as defined in claim 11 wherein each of said longitudinally extending oar bar assemblies includes two spaced apart, parallel oar bars.

13. The device as defined in claim 12 wherein each of said oar heads includes a pair of spaced apart, oppositely, inwardly open end caps, one end portion of one of said pair of spaced apart parallel oar bars extending axially therethrough in a fixed relation with both of said end caps.

14. The device as defined in claim 13 wherein said end caps are peripherally, rigidly interconnected by a plurality of strap means and are formed of an openwork structure to permit a free flow of water therethrough.

15. The device as defined in claim 14 wherein said oar blade means comprises a plurality of aligned, pivotal oar blade segments hinged relative to the periphery of each of said pair of end caps, said oar blade segments being pivotal between a first, closed relation to the inner cross sectional area of said oar heat and a second, open relation thereto.

16. The device as defined in claim 15 including outward extensions from each of said plurality of pivotal oar blades and counterweight means suspended from each extension in a manner so as to assist in pivoting said oar blade from said open to said closed relation.

17. The device as defined in claim 15 including stop means fixed relative to said pair of oar bars to normally retain said oar blade segments in said first, closed relation, and permitting said oar blades of the respective end caps to pivot to open positions in outwardly opposed directions.

18. The device as defined in claim 17 wherein each of said oar bar assemblies includes a slide bar engaged, and slidably maintained between each pair of said oar bars.

19. The device as defined in claim 18 including an enlarged tubular shift member fixed relative to each end of said slide bar within the confines of one of said oar heads, between the respective pluralities of oar blade segments hinged relative to said pair of end caps, whereupon sliding movement of said slide bar in a first direction will cause said tubular shift member to pivot the plurality of oar blade segments of the first of said pair of end caps to said open relation, permitting the oar blade segments of the second of said pair of end caps to remain in said normal closed relation; sliding movement of said slide bar in a second direction will cause said tubular shift member to reverse the open and closed relations of said pluralities of oar blades.

20. The device as defined in claim 19 wherein said means to selectively shift comprises a second pulley directed cable means, controlled by a forward, neutral and reverse selector lever, to said slide bars of the respective oar assemblies, whereby a synchronized forward or reverse movement, from a neutral position, may be selectively imparted to said slide bars to synchronously actuate the two pluralities of oar blade segments associated with each of the four oar heads of the two oar assemblies to convert the single directional movement of said rotary sail structure to selective forward or reverse movement of the boat.

21. The device as defined in claim 1 including counterweight means suspended from each of said outer rectangular frames in a manner so as to assist said outer frame in pivoting to an aligned position with said inner frame from said downwind direction.

* * * * *